March 28, 1939.  J. A. RAMSEY ET AL  2,151,938
LIFESAVING LIGHT
Filed Sept. 16, 1937
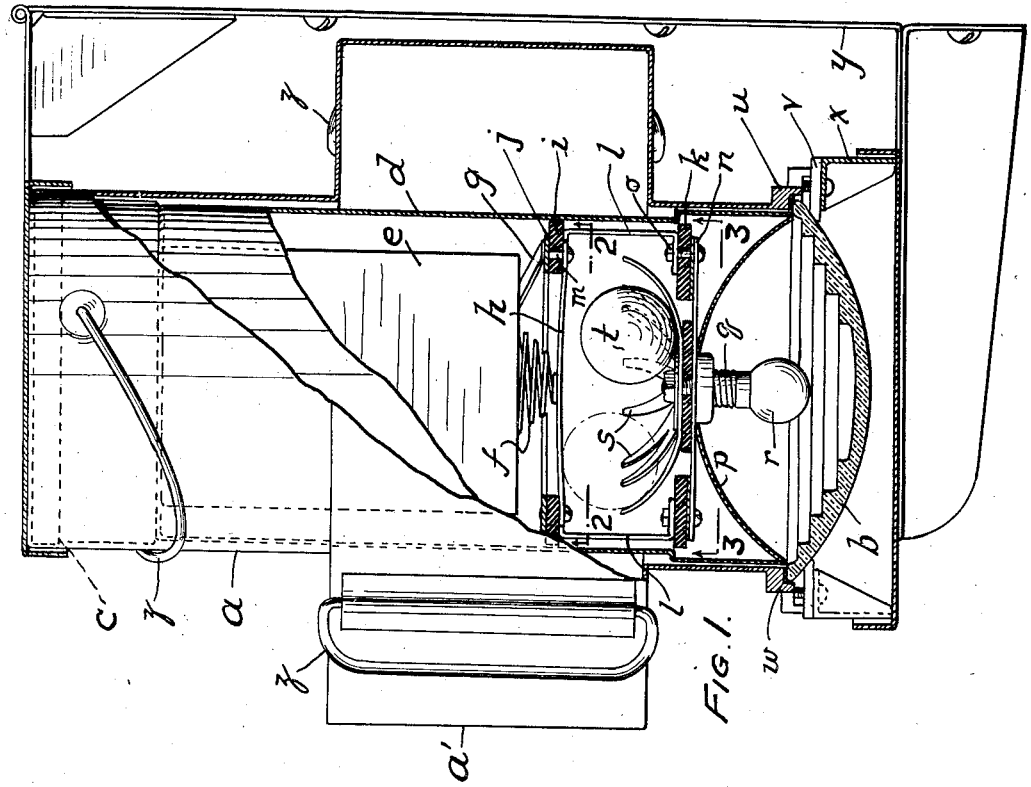
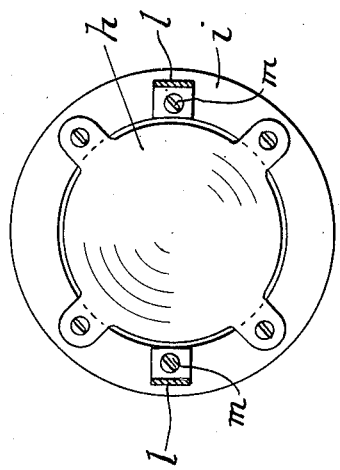
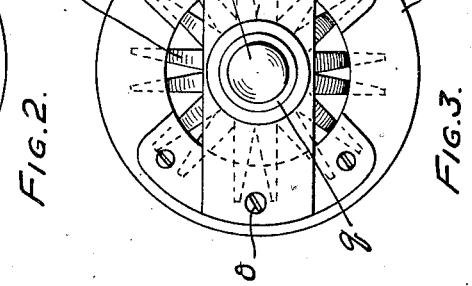
WITNESS:
INVENTORS
Jesse A. Ramsey &
William O'Neal
BY
ATTORNEYS.

Patented Mar. 28, 1939

2,151,938

UNITED STATES PATENT OFFICE 2,151,938

LIFESAVING LIGHT

Jesse A. Ramsey, Wenonah, N. J., and William O'Neal, Drexel Hill, Pa., assignors of one-half to John G. Pew, Media, Pa., and Richard L. Burke, Swarthmore, Pa.

Application September 16, 1937, Serial No. 164,096

1 Claim. (Cl. 240—10.6)

This invention relates to an improvement in life saving light and relates more particularly to a light adapted for use in cases of disaster at sea and more especially in connection with ring buoys, life jackets, and the like.

Heretofore it has been common and, indeed, required practice on ships to provide a source of light in connection with ring buoys carried for use largely in cases where persons go overboard from a ship at sea. The source of light usually provided is attached to a ring buoy by a length of line and is one having the capacity for self-ignition and adapted to burn with a relatively intense light for a substantial period.

Such sources of light, while of definite value for the purpose intended, are subject to definite limitation and hence of limited value. Thus, for example, such sources of light have no capacity for use aboard ship as a source of light in the event of disaster in which, as an incident, the ship's lighting system fails; and, again, while in the water they function desirably, they burn out within a comparatively short time.

Now in accordance with this invention a light is provided which lends itself to efficient use in cases of emergencies on board ship and, at the same time, lends itself to efficient use in the water in connection with ring buoys, life jackets, and the like.

The light in accordance with this invention will be found to be especially adapted for use in connection with the safety of the passengers and crew of a vessel in the event of disaster resulting in failure of the vessel's lighting system, since it lends itself to use in lighting the way from within the vessel to the open decks and also as a locating signal for one equipped with a life jacket and floating in the sea.

Having now indicated in a general way the nature and purpose of this invention, we will proceed to a detailed description thereof with reference to the accompanying drawing by which a preferred embodiment is illustrated and in which:

Figure 1 is a view, partly in section, of a life saving light embodying this invention.

Figure 2 is a sectional view on lines 2—2 of Figure 1.

Figure 3 is a sectional view on lines 3—3 of Figure 1.

Generally speaking, the light in accordance with this invention comprises a water-tight casing, provided with a lens and adapted to float in water, enclosing an electric battery, a lamp, and means of such a character for connecting and disconnecting the battery and lamp that, with the casing in one position, they will be disconnected and in another connected, while in floated position they will be intermittently connected and disconnected with movement of the casing in movement of the water.

Thus, as will appear in greater detail from the following description, the light in accordance with this invention may be, for example, placed in a passenger cabin and, when need arises, used by a passenger as an aid in traversing passages to the open deck, and finally, secured to a life jacket, as a flashing signal to fix the location of the passenger when floating in the water.

Referring now to the drawing, $a$ indicates a casing, generally cylindrical in shape and having an enlarged section $a'$ providing an air chamber for the flotation of the light. The casing $a$ may be made of any suitable material, as metal, and desirably will be made of a non-corrosive metal, as brass or copper.

The casing $a$, of water-tight construction, is open at one end for the reception of a lens $b$ which acts to close it, and is weighted, as by a lead insert $c$, at the other end so that when placed in water it will float with the lens up and out of the water.

$d$ indicates a second open-ended casing made of any suitable material, as metal, fiber, or the like, generally cylindrical in shape and of a size to telescope within the casing $a$.

Within the casing $d$ is positioned an electric battery $e$, for example, a dry battery, having spring plus and minus terminals $f$ and $g$.

A disc $h$, of conducting material, as copper or brass, secured to the upper side of a non-conducting fiber ring $i$, rests on the plus terminal of the battery $e$, while a ring $j$ of conducting material secured to the lower side of the ring $i$, rests on the minus terminal $g$ of the battery. A second non-conducting ring $k$ is secured concentrically in spaced relation to ring $i$ by means of spacers $l$ of conducting material and which are in contact with the conducting ring $j$ through bolts $m$ of conducting material, by which they are secured to ring $i$, and with conducting elements $n$ on the upper side of ring $k$, through bolts $o$ of conducting material, by which they are secured to the ring $k$.

A lamp socket $q$, of conducting material, is secured in contact with the elements $n$, and a lamp $r$ is fitted into the socket $q$. Secured to the central contact of the lamp $q$ and positioned beneath the ring $k$ is a spider $s$ formed of conducting material and the arms of which are spaced above the disc $h$ and in their outward extension are curved downwardly toward the disc $h$. A reflector $p$ is provided for the lamp $r$.

A ball $t$, of conducting material and of a diameter less than the spacing of the center of the spider $s$ from the disc $h$, is positioned between the spider and the disc $h$.

The lens $b$, which closes the open end of the casing $a$, fits, together with a packing ring $w$, within a flange $u$ formed about the end of the casing and is secured in place by means of a series of clamps $v$ secured to the casing by screws, which act also to secure to the casing, feet $x$ upon which the light rests when placed in a holder $y$ secured to a bulkhead.

The casing $a$ may and will desirably be provided with handles $z$, one on the end opposite to the lens $b$ and a pair on opposite sides of the air chamber $a'$.

When the light is assembled the casing $d$, the battery, the several conducting elements and the lamp, will be inserted in the casing $a$ and the lens $b$ secured in place over the lamp.

Ordinarily the light will be positioned in the holder $y$ with the lens down. In such position, as will be apparent, the ball $t$ will rest on the spider $s$ clear of the disc $h$ and the battery and lamp will be disconnected, as shown in Fig. 1.

When it is desired to use the light, it is removed from the holder and if it be desired to use it to light one's way, it is held horizontal by one or both of the handles $z$ at opposite sides of the air chamber. In such position the ball $t$ will lie in contact with the edge of disc $h$ and fingers of the spider $s$ and the battery and lamp will be continuously connected and a constant light will result.

If now the light is floated on the water, it will, due to its weighting, assume a position with the lens up and in such position the ball $t$ will rest on the disc $h$ and will roll freely thereon with movement of the light, as from wave motion, into and out of contact with the end portions of the fingers of the spider $s$ and an intermittent or flashing light will be obtained.

As will be obvious, the light may be permanently fastened to a ring buoy or life jacket by means of a light line or it may be provided with a light line enabling it to be readily fastened to a life jacket before the wearer goes into the water.

The advantages of the light in disaster at sea will, it is believed, be obvious from the above description.

It will be understood that it is not contemplated that this invention shall be limited to the details included in the above description of a preferred embodiment, since, as will be obvious, various modification in detail may be made without departing from the scope of the invention.

What we claim and desire to protect by Letters Patent is:

A life saving light comprising, in combination, a water-tight casing, a lens in a wall of the casing, an electric battery within the casing, a lamp socket within the casing and positioned in line with the lens, a lamp in the socket, and means for automatically connecting and disconnecting the battery and lamp, said means comprising a conducting plate in contact with one terminal of the battery and with one terminal of the lamp socket, a curved spider of conducting material in contact with the other terminal of the battery and the other terminal of the lamp socket, the curved spider being arranged with its concave side opposite to said conducting plate and a freely movable ball of conducting material of a diameter less than the maximum distance between said conducting plate and said spider and greater than the minimum distance between said conducting plate and said spider, said conducting plate and said spider being so arranged that when the casing is in a vertical position with the lens down the lamp socket will be disconnected from the battery, when the casing is in a horizontal position the lamp socket and battery will be continuously connected and when the casing is subjected to a rocking movement with the lens up the lamp socket will be intermittently connected with the battery.

JESSE A. RAMSEY.
WILLIAM O'NEAL.